Nov. 22, 1966  W. H. SIMMONS ET AL  3,287,031
INDEXED KEYED CONNECTION
Filed Sept. 21, 1964  2 Sheets-Sheet 1
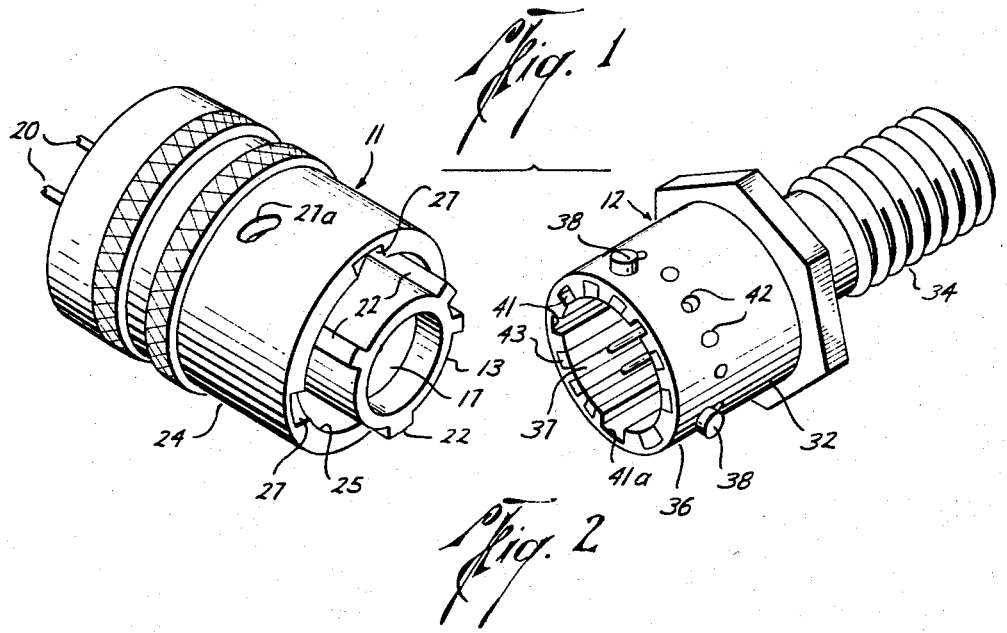
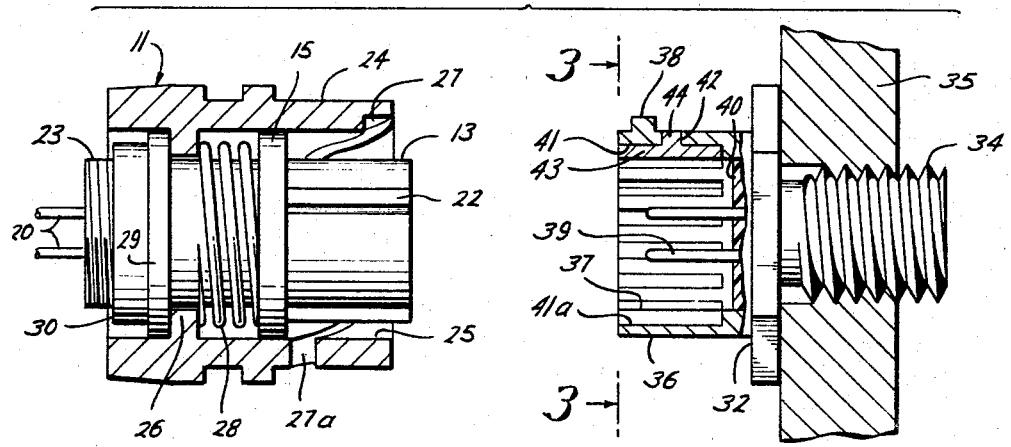
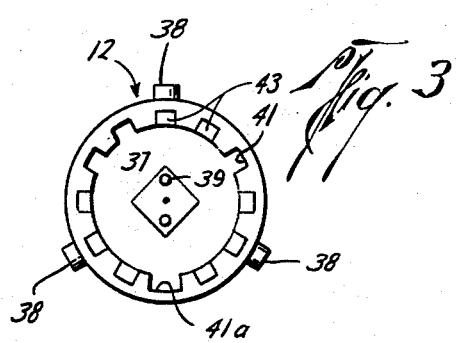
William H. Simmons
Lyle M. Jenkins
INVENTORS
BY Marvin F. Matthews
J. H. McCoy
ATTORNEY Nov. 22, 1966  W. H. SIMMONS ETAL  3,287,031
INDEXED KEYED CONNECTION
Filed Sept. 21, 1964  2 Sheets-Sheet 2
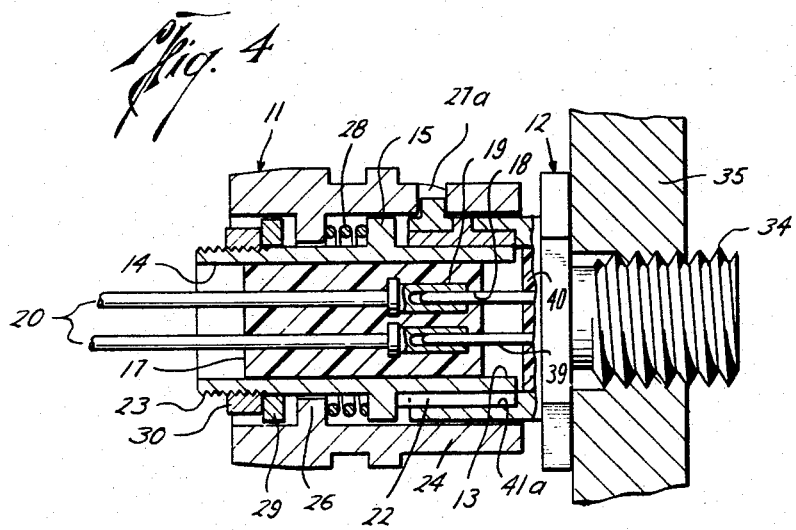
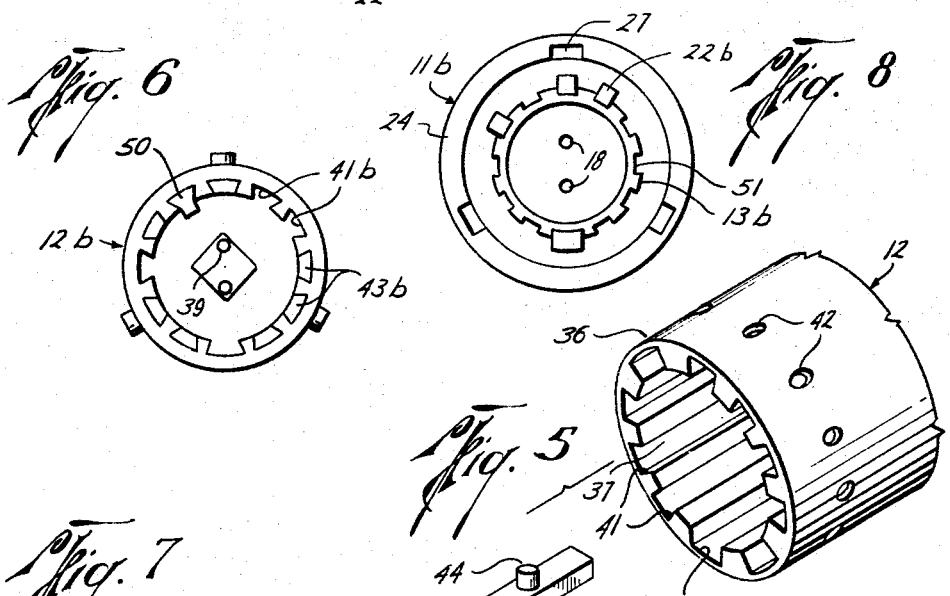
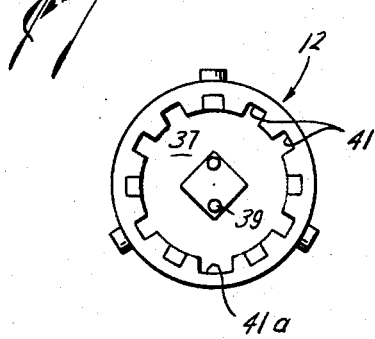
William H. Simmons
Lyle M. Jenkins
INVENTORS
BY Marvin F. Matthews
 J H McCoy
ATTORNEY 3,287,031
INDEXED KEYED CONNECTION
William H. Simmons and Lyle M. Jenkins, Houston, Tex., assignors to the United States of America as represented by the National Aeronautics and Space Administration
Filed Sept. 21, 1964, Ser. No. 398,132
1 Claim. (Cl. 285—27)

The invention described herein may be manufactured and used by or for the Government of the United States of America for governmental purposes without the payment of any royalties thereon or therefor.

This invention relates to improvements in connections of the type comprising male and female coupling members and more particularly relates to improvements in such connections which include an indexing means as a part thereof in order to insure that only selected male and female coupling members are joined together.

Whenever two or more like male couplings are to be joined to two or more like female couplings in close proximity of each other, the possibility of mating a male coupling to the wrong female coupling always exists. This is especially true when the vision of the person making these connections is obstructed. Such a situation exists in several present-day space vehicles wherein a plurality of small explosive charges (commonly called initiators) must be coupled to their corresponding electrical firing leads. These initiators are used to actuate release mechanisms as, for instance, in separating rocket stages one from another, to start various motors located throughout the vehicle, and male to perform a wide variety of other functions each of which is vital to the successful operation of these vehicles. Due to the limited space available on such vehicles, some areas in which several of these initiators are located side by side are highly congested and the actual connecting of the electrical firing leads to their selected initiators can be done only by the feel of the operator since he cannot actually see what he is doing. It can easily be seen that if a firing lead is coupled to the wrong initiator, disaster could and probably would result therefrom. Therefore, some means must be included in each of these connections which will eliminate any possibility of mismating the firing leads and their selected initiators.

Systems of color codes have been proposed which aid in identifying matching components but these systems have not proved entirely satisfactory in and of themselves since they do not include any means which will positively insure against the mismating of components. Also, since only a relatively few initiators are used in each space vehicle, it is impractical from a cost standpoint to make each initiator of a different size and shape in order to insure against the accidental miscoupling of the firing leads. As a partial solution to this problem, a standard type initiator has been developed which can be used throughout the space vehicle to perform any of the desired variety of functions but which is individually indexed according to the particular function it is to perform so that only the correct firing lead can be coupled thereto.

Such an initiator is presently in use. However, it has been found that even though the initiator itself can be produced on a large scale, the actual indexing operation still makes its use extremely expensive since each initiator requires a separate handling step in the manufacturing process to properly index it for its particular function.

The present invention provides a means by which a standard female coupling (such as the one on the above mentioned initiator) can be produced in large quantities without requiring a separate and expensive indexing step for each initiator. In the present invention, a plurality of longitudinally extending slots are provided around the inner periphery of the chamber within the female coupling member which receives the male coupling member of the connection. Special plug members are press-fitted or otherwise secured into each of these slots during the manufacturing process so that upon completion of manufacture all of the slots in each female coupling are blocked by these plugs. At the time of installation or use of the female coupling, one or more of these plug members are easily removed to provide a predetermined pattern of open slots whereby only a selected male coupling having keys arranged in the same predetermined pattern can be joined thereto. Furthermore, the present invention allows the male coupling of this connection to be manufactured so that it can easily be individually indexed in the same manner as that of the female coupling at time of its use or installation. Through use of this invention both female and male couplings can be mass produced by a standardized manufacturing process which does not require a separate operation of indexing each female or male coupling member individually during such process. Also, it can be seen that it is no longer necessary for a user to stock quantities of differently indexed female and male couplings since a single quantity of female and male couplings made in accordance with the present invention will serve the same purpose.

The invention will be better understood by referring to the drawings in which like numerals identify like parts in the different figures and in which:

FIG. 1 is a perspective view of the male and female coupling members of this invention when disconnected;

FIG. 2 is a vertical sectional view of the female coupling member of the invention and a partial vertical section of the male coupling member of the invention when disconnected;

FIG. 3 is an end view of the female member taken along the plane of line 3—3 of FIG. 2;

FIG. 4 is a vertical sectional view of the female and male coupling members of this invention when connected together;

FIG. 5 is an exploded perspective view of the female coupling member and one of the plug members therefor;

FIG. 6 is an end view of a modified form of the female coupling member of this invention;

FIG. 7 is an end view of the female coupling member of FIG. 3 with different plug members removed to illustrate a different index pattern; and FIG. 8 is an end view of a modified form of the male coupling member shown in FIG. 1.

The connection in accordance with the present invention consists of a male coupling or connector 11 and a female coupling 12. The connector 11 is comprised of an inner male element 13 having a longitudinal passage 14 therethrough (see FIG. 4) and a flange 15 extending outward from the outer periphery thereof. A socket member 17 of any known insulation material is press-fitted, bonded, or otherwise secured into passage 14. Socket 17 has a plurality of probe-receiving openings 18 in which contact elements 19 are mounted which in turn are connected to electrical leads 20. At one end of element 13, a plurality of elongated keys 22 extend longitudinally along element 13 and are secured about the circumference thereof in a predetermined pattern for a purpose set forth below. The other end of element 13 is threaded as shown at 23.

The outer element 24 has a longitudinally extending passage 25 therethrough and has a flange 26 extending inward therefrom. A plurality of spiral-like locking grooves 27 terminating in lock holes 27a are provided at one end of element 24 for a purpose which will be explained below.

To assemble connector 11, male element 13 is inserted into outer element 28. A spring 28 is positioned on element 13 before assembly so that it will coact between flange 15 on element 13 and flange 26 on element 24. Washer 29 is then placed over threaded end 23 of element 13 and lock nut 30 is threaded thereon to lock elements 13, 24 in an assembled position.

It can readily be seen that member 13 can move both longitudinally and rotationally with relation to member 24 and that spring 28 will normally bias the elements of the connector to the position shown in FIG. 2.

The female member 12 of the connection (which is shown here as an electrically ignited initiator) has a body 32 which is threaded at one end 34 so that it can be connected to a threaded socket or assembly when in use. Since the explosive end of the initiator forms no part of the present invention, only the indexed end 36 thereof has been shown in detail. The end 36 of body 32 has a male member receiving chamber 37 therein and has a plurality of locking lugs 38 spaced about the outer circumference thereof. A plurality of probes 39 extend from threaded end 34 of female member 12 through a layer 40 of insulation material into receiving chamber 37.

The inner periphery of chamber 37 is provided with a plurality of longitudinally extending grooves 41 (see FIGS. 1 and 4). Twelve grooves have been shown here but it should be understood that this number could vary without in any way affecting the successful function of the invention. The master groove 41a at the bottom is normally larger than the other grooves to provide a reference point for various indexing patterns. Holes 42 are tapped through body 32 and into grooves 41 for a purpose described below. Individual plug members 43 are press-fitted or otherwise secured into grooves 41 at the time of manufacture. The plug members 41 have a lug 44 rigidly secured thereon. This lug 44 fits into hole 42 in the groove when the plug is placed therein and provides a means for easy removal of the plugs when the actual indexing operation is performed.

In practicing the invention, male element 13 of connector 11 is provided with a plurality of keys 22 in a predetermined pattern as shown in FIG. 1. The female coupling 12 is indexed to correspond with this key pattern by removing the necessary plugs 43 from grooves 41. This can easily be done by placing a punch or like tool against lug 44 on plug 43 which is exposed through hole 42 and tapping the punch to force the plug out of the groove. After the desired plugs are removed from the female coupling, only the proper male connector can be coupled thereto.

It can easily be seen from FIG. 4 that keys 22 on male element 13 will mate with open grooves 41 in receiving chamber 37 and will allow male element 13 to be received therein. This allows probes 39 to enter openings 18 and contact members 19 to establish electrical communication between the electrical firing leads 20 and the initiator. Once the keys and slots are mated, outer element 24 is rotated with respect to element 13 until locking grooves 27 are aligned with locking lugs 38 on the female member. When this occurs, continued rotation of element 24 along with slight forward pressure will cause lugs 38 to ride down grooves 27 in a threading-like action until lugs 38 engage lock holes 27a to lock the two couplings together. During this locking operation, the construction of the connector allows the element 24 to move forward relative to element 13 against the bias of spring 28 as shown in FIG. 4. The compression force of spring 28 will tend to force male element 13 into the innermost position within the chamber 37. This insures a tight connection between the coupling members.

It should be obvious from this description that different indexing patterns can be provided in female coupling 12 by merely removing different keys (see FIG. 7). Also, the number of open slots can vary which further increase the number of patterns available with this invention.

In FIG. 8 there is shown a male connector 11b which can be indexed at the time of installation. Connector 11b is identical to that shown in FIGS. 1 and 2 with the exception of the inner or male element 13b which is provided with a plurality of grooves 51 at the time of manufacture. A plurality of keys 22b can be press-fitted or otherwise secured in selected grooves to form a predetermined index pattern at the time of use or each of the grooves 51 can be filled by keys 22b at time of manufacture with certain of these keys being removed at time of use.

The modification shown in FIG. 6 is identical to that shown in FIG. 3 except for the configuration of the grooves and the design of the plugs therefor. Female member 12b has a plurality of dovetailed longitudinally extending grooves 41b into which dovetailed shaped plugs 43b are placed. This dovetailed configuration provides a means for holding the plugs in place until their removal is desired. These plugs cannot be tapped out as those in the previously disclosed modification but can be easily removed by merely pulling the plugs forward out the grooves. This can be done with a hooked wire or the like. It should be noted that the sizing of the plugs and their corresponding grooves is such that friction between the two will prevent the plugs from merely slipping out before removal of the plugs is desired.

A slightly different plug member 50 is shown also in FIG. 6 which has a portion extending out of its groove into receiving chamber 37b. When one or more plugs 50 are used, corresponding grooves are provided in element 13 of connector 11. By using such a plug, the possible number of different and distinct indexing patterns can be increased without changing the standard female member or its manufacturing process.

It should be obvious that the present invention provides both male and female coupling members of a connection that can be mass produced and at the same time provide coupling members which can also be readily indexed so that they will only mate with each other.

While particular embodiments of the female and male members have been illustrated and described, it will be obvious that changes and modifications can be made without departing from the spirit of the invention and the scope of the appended claim.

What is claimed and desired to be secured by Letters Patent is:

A female coupling comprising an elongated body having a chamber therein adapted to receive a male coupling, said body having a plurality of elongated longitudinally extending slots therein which are spaced about the periphery of said chamber, said slots having one side opening into said chamber, said body also having a plurality of holes each of which extend from outside said body into one of said slots, and plug means removably secured in each of said slots said plug means having a lug thereon extending into said hole.

References Cited by the Examiner
UNITED STATES PATENTS

| | | | |
|---|---|---|---|
| 743,713 | 11/1903 | Gorman | 287—52.05 X |
| 808,219 | 12/1905 | Schroeder | 285—362 X |
| 1,460,135 | 6/1923 | Jones. | |
| 2,372,269 | 3/1945 | Golan | 85—32 X |
| 2,443,688 | 6/1948 | McFarland | 287—53 |
| 2,815,229 | 12/1957 | Cook | 287—52.05 |
| 2,892,991 | 6/1959 | Beebee et al. | 285—93 X |
| 2,905,490 | 9/1959 | Trandel | 287—52.05 X |

(Other references on following page)

References Cited by the Applicant

UNITED STATES PATENTS

| | | |
|---|---|---|
| 1,034,910 | 8/1912 | Grenway. |
| 2,890,445 | 6/1959 | Korry. |
| 2,928,998 | 3/1960 | Brumfield. |
| 2,935,338 | 5/1960 | Mills. |
| 3,008,116 | 11/1961 | Blanchenot. |
| 3,023,394 | 2/1962 | Hubbell. |
| 3,035,243 | 5/1962 | Bowling. |
| 3,082,394 | 3/1963 | Hahn et al. |
| 3,096,135 | 7/1963 | Feustel et al. |
| 3,097,905 | 7/1963 | Shearer et al. |

THOMAS F. CALLAGHAN, *Primary Examiner.*

D. W. AROLA, *Assistant Examiner.*